US012022879B2

(12) United States Patent
Jeong et al.

(10) Patent No.: US 12,022,879 B2
(45) Date of Patent: Jul. 2, 2024

(54) HEATER ASSEMBLY, METHOD OF MANUFACTURING HEATER ASSEMBLY, AND AEROSOL GENERATING DEVICE INCLUDING HEATER ASSEMBLY

(71) Applicant: KT&G CORPORATION, Daejeon (KR)

(72) Inventors: Jong Seong Jeong, Sejong (KR); Gyoung Min Go, Daejeon (KR); Jang Won Seo, Daejeon (KR); Yong Joon Jang, Daejeon (KR); Chul Ho Jang, Daejeon (KR); Min Seok Jeong, Seoul (KR); Jin Chul Jung, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 718 days.

(21) Appl. No.: 17/266,001

(22) PCT Filed: Jul. 17, 2020

(86) PCT No.: PCT/KR2020/009413
§ 371 (c)(1),
(2) Date: Feb. 4, 2021

(87) PCT Pub. No.: WO2021/015496
PCT Pub. Date: Jan. 28, 2021

(65) Prior Publication Data

US 2021/0161212 A1 Jun. 3, 2021

(30) Foreign Application Priority Data

Jul. 23, 2019 (KR) ........................ 10-2019-0089213

(51) Int. Cl.
*A24F 40/51* (2020.01)
*A24F 40/20* (2020.01)
(Continued)

(52) U.S. Cl.
CPC .............. *A24F 40/51* (2020.01); *A24F 40/20* (2020.01); *A24F 40/465* (2020.01); *A24F 40/57* (2020.01);
(Continued)

(58) Field of Classification Search
CPC ........ A24F 40/51; A24F 40/20; A24F 40/465; A24F 40/57; A24F 40/70; A24F 47/00;
(Continued)

(56) References Cited

U.S. PATENT DOCUMENTS 10,834,968 B2 11/2020 John et al.
10,863,770 B2 12/2020 Mironov et al.
(Continued)

FOREIGN PATENT DOCUMENTS

CA 3078860 * 4/2019 ............ A61M 15/06
CA 3076886 A1 5/2019
(Continued)

OTHER PUBLICATIONS

Office Action dated Apr. 25, 2023 from the Chinese Patent Office in Application No. 202080005689.0.
(Continued)

*Primary Examiner* — Truc T Nguyen
(74) *Attorney, Agent, or Firm* — Sughrue Mion, PLLC

(57) ABSTRACT

A heater assembly includes a heating layer having at least a portion including a susceptor material generating heat by an external magnetic field and having a cylindrical shape therein in which an accommodation space configured to accommodate the cigarette is formed, an insulating layer surrounding at least a portion of an outer side surface of the heating layer, and a sensor pattern embedded in the insulating layer and configured to measure a temperature.

13 Claims, 6 Drawing Sheets

(51) Int. Cl.

| | |
|---|---|
| ***A24F 40/465*** | (2020.01) |
| ***A24F 40/57*** | (2020.01) |
| ***A24F 40/70*** | (2020.01) |
| ***H05B 6/06*** | (2006.01) |
| ***H05B 6/10*** | (2006.01) |

(52) U.S. Cl.
CPC ............... *A24F 40/70* (2020.01); *H05B 6/06* (2013.01); *H05B 6/105* (2013.01)

(58) Field of Classification Search
CPC .......... A24F 40/40; A24F 40/46; H05B 6/06; H05B 6/105; H05B 6/108; H05B 6/10; H05B 3/54; H05B 2203/03
See application file for complete search history.

(56) References Cited

U.S. PATENT DOCUMENTS

| | | | | |
|---|---|---|---|---|
| 10,881,144 | B2 | 1/2021 | Batista et al. | |
| 11,064,725 | B2 * | 7/2021 | Wilke | A24C 5/01 |
| 11,452,313 | B2 * | 9/2022 | Kaufman | A24F 40/465 |
| 11,659,863 | B2 * | 5/2023 | Blandino | A24F 40/46 392/386 |
| 2015/0245669 | A1 * | 9/2015 | Cadieux | A61M 15/06 131/329 |
| 2017/0055583 | A1 | 3/2017 | Blandino et al. | |
| 2017/0231276 | A1 * | 8/2017 | Mironov | H05B 1/0244 131/328 |
| 2019/0200677 | A1 * | 7/2019 | Chong | A61M 15/0021 |
| 2019/0387787 | A1 * | 12/2019 | Hejazi | A24D 1/20 |
| 2020/0046028 | A1 | 2/2020 | Oh et al. | |
| 2020/0054069 | A1 | 2/2020 | Blandino et al. | |
| 2020/0154784 | A1 * | 5/2020 | Sebastian | A61M 15/06 |
| 2020/0221773 | A1 | 7/2020 | An | |
| 2020/0237018 | A1 * | 7/2020 | Sur | H05B 6/108 |
| 2020/0281249 | A1 * | 9/2020 | Sebastian | A24D 1/14 |
| 2020/0375256 | A1 * | 12/2020 | Chong | A24F 40/51 |
| 2023/0189404 | A1 * | 6/2023 | Chae | A24F 40/20 392/386 |
| 2023/0301364 | A1 * | 9/2023 | Mironov | A61M 15/06 |
| 2023/0320419 | A1 * | 10/2023 | Jeong | A24F 40/51 131/207 |

FOREIGN PATENT DOCUMENTS

| | | | | |
|---|---|---|---|---|
| CN | 107920602 A | | 4/2018 | |
| EP | 3 248 484 B1 | | 5/2019 | |
| JP | 2017-117525 A | | 6/2017 | |
| JP | 2018-529324 A | | 10/2018 | |
| KR | 10-2017-0107550 A | | 9/2017 | |
| KR | 10-1938512 B1 | | 10/2017 | |
| KR | 10-2018-0040519 A | | 4/2018 | |
| KR | 10-2018-0117039 A | | 10/2018 | |
| KR | 10-1989855 B1 | | 10/2018 | |
| KR | 20180117071 | * | 10/2018 | H05B 3/46 |
| KR | 10-2019-0015224 A | | 2/2019 | |
| KR | 10-2019-0049405 A | | 5/2019 | |
| WO | 2019/030364 A1 | | 2/2019 | |
| WO | 2021/025332 A1 | | 2/2021 | |

OTHER PUBLICATIONS

International Search Report for PCT/KR2020/009413 dated Oct. 27, 2020 [PCT/ISA/210].

Written Opinion for PCT/KR2020/009413 dated Oct. 27, 2020 [PCT/ISA/237].

Notice of Reasons for Refusal dated Dec. 7, 2021 from the Japanese Patent Office in JP Application No. 2020-551315.

Extended European Search Report date Dec. 16, 2021 from the European Patent Office in EP Application No. 20785664.2.

* cited by examiner

HEATER ASSEMBLY, METHOD OF MANUFACTURING HEATER ASSEMBLY, AND AEROSOL GENERATING DEVICE INCLUDING HEATER ASSEMBLY

CROSS REFERENCE TO RELATED APPLICATIONS

This application is a National Stage of International Application No. PCT/KR2020/009413 filed Jul. 17, 2020, claiming priority based on Korean Patent Application No. 10-2019-0089213 filed Jul. 23, 2019.

TECHNICAL FIELD

The present disclosure relates to a heater assembly, a method of manufacturing a heater assembly, and an aerosol generating device including a heater assembly. More particularly, the present disclosure relates to a heater assembly including a susceptor material which generates heat by an external magnetic field, a method of manufacturing the same, and an aerosol generating device including a heater assembly.

BACKGROUND ART

Recently, the demand for alternative methods to overcome the shortcomings of general cigarettes has increased. For example, there is an increasing demand for a method of generating aerosol by heating a cigarette medium in cigarettes, rather than by burning cigarettes. Accordingly, studies on a heating-type cigarette and a heating-type aerosol generating device have been actively conducted.

An alternative heating method has been proposed to replace a method of arranging a heater including an electrical resistor in an aerosol generating device and supplying power to the heater to heat a cigarette accommodated in the aerosol generating device. For example, research is being conducted into an induction heating method of heating cigarettes by using a magnetic body, which generates heat by a magnetic field applied from the outside.

When a cigarette is heated by a magnetic body, which generates heat by a magnetic field, because a coil or the like configured to apply the magnetic field to the magnetic body must be included in an aerosol generating device in addition to the cigarette and the magnetic body, additionally arranging a separate temperature sensor in the aerosol generating device may be difficult in terms of space. Accordingly, because maintaining constant a temperature at which the cigarette is heated by directly measuring the temperature of the magnetic body may be difficult, aerosol is unevenly generated from the cigarette and smoking quality may decrease.

Therefore, to improve smoking quality by more precisely controlling the temperature at which a cigarette is heated, a structure of the magnetic body that allows the temperature of the cigarette heated by the magnetic body to be measured without a temperature sensor may be required.

DESCRIPTION OF EMBODIMENTS

Technical Problem

Provided are a heater assembly, a method of manufacturing a heater assembly, and an aerosol generating device including a heater assembly. The technical problems of the present disclosure are not limited to the above-described description, and other technical problems may be derived from the embodiments to be described hereinafter.

Solution to Problem

According to an aspect of the present disclosure, a heater assembly configured to heat a cigarette may include a heating layer having at least a portion including a susceptor material generating heat by an external magnetic field and having a cylindrical shape therein in which an accommodation space configured to accommodate the cigarette is formed, an insulating layer surrounding at least a portion of an outer side surface of the heating layer, and a sensor pattern embedded in the insulating layer and configured to measure a temperature of the heating layer.

According to another aspect of the present disclosure, a method of manufacturing a heater assembly configured to heat a cigarette may include forming a heating layer having at least a portion including a susceptor material generating heat by an external magnetic field and having a cylindrical shape therein in which an accommodation space configured to accommodate the cigarette is formed, coating, on an outer side surface of the heating layer, a first insulating layer surrounding at least a portion of the outer side surface of the heating layer, printing, on an outer side surface of the first insulating layer, a sensor pattern configured to measure a temperature of the heating layer, and coating a second insulating layer on the outer side surface of the first insulating layer to embed the sensor pattern.

According to another aspect of the present disclosure, an aerosol generating device including a heater assembly may further include a coil configured to apply an alternating magnetic field to the heater assembly, a power supply unit configured to supply power to the coil, and a controller configured to control power supplied to the coil.

Advantageous Effects of Disclosure

In a case of a heater assembly of the present disclosure, because a heating layer including a susceptor material and a sensor pattern configured to measure the temperature of the heating layer may be formed as a single body, the temperature at which a cigarette is heated may be measured without a separate temperature sensor, and accordingly, the structure of an aerosol generating device may be simplified.

In addition, in an aerosol generating device including a heater assembly, because the temperature at which a cigarette is heated may be relatively accurately measured by a sensor pattern formed as a single body with a heating layer, the temperature at which the cigarette is heated may be precisely controlled, and accordingly, the quality at which an aerosol is produced may be improved.

BEST MODE

Figure 1:
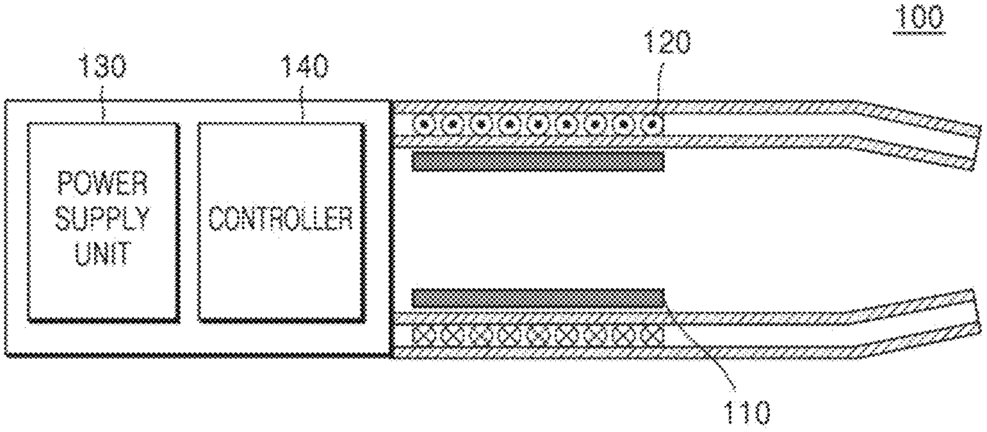
FIG. 1 is a diagram explaining components configuring an aerosol generating device including a heater assembly according to some embodiments.

A heater assembly according to an aspect includes a heating layer having at least a portion including a susceptor material which generates heat by an external magnetic field and having a cylindrical shape therein in which an accommodation space configured to accommodate the cigarette is formed, an insulating layer surrounding at least a portion of an outer side surface of the heating layer, and a sensor pattern embedded in the insulating layer and configured to measure a temperature.

In addition, the sensor pattern is formed by printing a resistor having a temperature coefficient of resistance (TCR) deriving the temperature of the heating layer.

In addition, the sensor pattern includes at least one material of ceramic, a semiconductor, metal, carbon, and a thermistor.

In addition, the metal includes at least one of silver (Ag) and palladium (Pd), and the sensor pattern includes silver in a weight ratio of 45 to 70 and palladium in a weight ratio of 10 to 35.

In addition, the insulating layer includes a first insulating layer configured to support an inner side surface of the sensor pattern and a second insulating layer configured to surround the outer side surface of the sensor pattern.

In addition, the insulating layer includes at least one material of silicon (Si) oxide, boron (B) oxide, calcium (Ca) oxide, zirconium (Zr) oxide, and aluminum (Al) oxide.

In addition, the susceptor material includes at least a portion including a ferromagnetic body.

In addition, the heater assembly may further include an electrode connected to the sensor pattern and configured to read a characteristic value of the sensor pattern.

A method of manufacturing a heater assembly according to another aspect includes forming a heating layer having at least a portion including a susceptor material generating heat by an external magnetic field and having a cylindrical shape therein in which an accommodation space configured to accommodate the cigarette is formed, coating, on an outer side surface of the heating layer, a first insulating layer surrounding at least a portion of the outer side surface of the heating layer, printing, on an outer side surface of the first insulating layer, a sensor pattern configured to measure a temperature of the heating layer, and coating a second insulating layer on the outer side surface of the first insulating layer to embed the sensor pattern.

An aerosol generating device according to another aspect includes the heater assembly and further includes a coil configured to apply an alternating magnetic field to the heater assembly, a power supply unit configured to supply power to the coil, and a controller configured to control power supplied to the coil.

In addition, the coil is wound along an outer side surface of the heater assembly, extends in a longitudinal direction of the aerosol generating device, and is arranged in a position corresponding to the heater assembly.

In addition, the power supply unit includes a battery configured to supply a direct current to the aerosol generating device, and a conversion unit configured to convert the direct current supplied from the battery into an alternating current to be applied to the coil.

In addition, the controller is configured to receive, from the sensor pattern, a characteristic value of the sensor pattern associated with the temperature of the heating layer, and adjust the power supplied to the coil from the power supply unit based on the temperature of the heating layer.

MODE OF DISCLOSURE

Hereinafter, example embodiments will be described in detail with reference to the drawings. It is to be understood that the following description is only for the purpose of embodying the embodiments and does not limit the scope of the present disclosure. Contents which can be easily derived by one of ordinary skill in the art should be construed as being included in the scope of the present disclosure.

In the present disclosure, it is to be understood that the term such as "configuring" or "including" is intended to indicate the existence of the various components or various operations disclosed in the present disclosure, some of the components or operations may be absent, and are not intended to preclude the possibility that additional components or operations may be added.

In the present disclosure, while such terms as "first," "second," etc., may be used to describe various components, such components must not be limited to the above terms. The above terms are used only to distinguish one component from another.

With respect to the terms in the present disclosure, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

The present embodiments relate to a heater assembly, a method of manufacturing a heater assembly, and an aerosol generating device including a heater assembly. Details that are well known to one of ordinary art to which the following embodiments pertain are omitted.

FIG. 1 is a diagram explaining components configuring an aerosol generating device including a heater assembly according to some embodiments.

Referring to FIG. 1, an aerosol generating device 100 may include a heater assembly 110, a coil 120, a power supply unit 130, and a controller 140. However, the present disclosure is not limited thereto. In addition to the components shown in FIG. 1, other general-purpose components may be further included in the aerosol generating device 100.

The aerosol generating device 100 may generate aerosol by heating a cigarette accommodated in the aerosol generating device 100 by an induction heating method. The induction heating method may refer to a method of heating a magnetic body by applying an alternating magnetic field, which has a periodically changing direction, to the magnetic body generating heat by an external magnetic field.

When an alternating magnetic field is applied to a magnetic body, energy loss according to eddy current loss and hysteresis loss may occur in the magnetic body, and the lost energy may be released from the magnetic body as thermal energy. The greater the amplitude of frequency of the alternating magnetic field applied to the magnetic body, the more heat energy may be released from the magnetic body. The aerosol generating device 100 may release thermal energy from a magnetic body by applying an alternating magnetic field to the magnetic body, and may transfer the thermal energy emitted from the magnetic body to a cigarette.

The magnetic body generating heat by the external magnetic field may include a susceptor. The susceptor may be provided in the aerosol generating device 100 in the shape of a piece, thin plate, strip or the like instead of being included in a cigarette. For example, at least a portion of the heater assembly 110 arranged in the aerosol generating device 100 may include a susceptor material.

At least a portion of the susceptor material may include a ferromagnetic body. For example, the susceptor material may include metal or carbon. The susceptor material may include at least one of ferrite, ferromagnetic alloy, stainless steel, and aluminum (Al). In addition, the susceptor material may include at least one of graphite, molybdenum, silicon carbide, niobium, nickel alloy, metal film, ceramics such as zirconia or the like, a transition metal such as nickel (Ni), cobalt (Co), or the like, and a metalloid such as boron (B) or phosphorus (P).

The aerosol generating device 100 may accommodate a cigarette. A space accommodating a cigarette may be formed in the aerosol generating device 100. The heater assembly 110 may be arranged in the space accommodating a cigarette. The heater assembly 110 may have a cylindrical shape therein in which an accommodation space accommodating a cigarette is formed. Accordingly, when a cigarette is accommodated in the aerosol generating device 100, the cigarette may be accommodated in the accommodation space of the heater assembly 110, and the heater assembly 110 may be arranged at a position surrounding at least a portion of an outer side surface of the cigarette.

The heater assembly 110 may surround at least a portion of the outer side surface of a cigarette accommodated in the aerosol generating device 100. For example, the heater assembly 110 may surround at least a portion of the outer side surface of a cigarette at a position corresponding to a position of a cigarette medium included in the cigarette. Accordingly, heat may be more efficiently transferred from the heater assembly 110 to the cigarette medium included in the cigarette.

The heater assembly 110 may heat a cigarette accommodated in the aerosol generating device 100. As described above, the heater assembly 110 may heat a cigarette in the induction heating method. The heater assembly 110 may include a susceptor material that generates heat by an external magnetic field, and the aerosol generating device 100 may apply an alternating magnetic field to the heater assembly 110.

The coil 120 may be included in the aerosol generating device 100. The coil 120 may apply an alternating magnetic field to the heater assembly 110. When power is supplied to the coil 120 from the aerosol generating device 100, a magnetic field may be formed inside the coil 120. When an alternating current is applied to the coil 120, a direction of the magnetic field formed inside the coil 120 may be continuously changed. When the heater assembly 110 is located inside the coil 120 and is exposed to an alternating magnetic field having a periodically changing direction, the heater assembly 110 may generate heat, and a cigarette accommodated in the heater assembly 110 may be heated.

The coil 120 may be wound along an outer side surface of the heater assembly 110. The coil 120 may be wound along an inner surface of an external housing of the aerosol generating device 100. The heater assembly 110 may be located in an inner space formed by winding the coil 120, and when power is supplied to the coil 120, an alternating magnetic field generated by the coil 120 may be applied to the heater assembly 110.

The coil 120 may extend in a longitudinal direction of the aerosol generating device 100. The coil 120 may extend to a proper length in the longitudinal direction. For example, the coil 120 may extend to a length corresponding to the length of the heater assembly 110, or may extend to a length greater than the length of the heater assembly 110.

The coil 120 may be arranged at a position suitable for applying an alternating magnetic field to the heater assembly 110. For example, the coil 120 may be arranged at a position corresponding to the heater assembly 110. The efficiency in which the alternating magnetic field of the coil 120 is applied to the heater assembly 110 may be improved by the size and arrangement of the coil 120.

When the amplitude or frequency of the alternating magnetic field formed by the coil 120 is changed, the degree to which the heater assembly 110 heats a cigarette may also be changed. Because the amplitude or frequency of the magnetic field by the coil 120 may be changed by the power to be applied to the coil 120, the aerosol generating device 100 may control the heating of a cigarette by adjusting the power to be applied to the coil 120. For example, the aerosol generating device 100 may control the amplitude and frequency of an alternating current to be applied to the coil 120.

As an example, the coil 120 may be implemented as a solenoid. The coil 120 may be a solenoid wound along the inner surface of the external housing of the aerosol generating device 100, and the heater assembly 110 and a cigarette may be located in an inner space of the solenoid. A material of a leading wire configuring the solenoid may be copper (Cu). However, the present disclosure is not limited thereto, and at least one of silver (Ag), gold (Au), aluminum (Al), tungsten (W), zinc (Zn), and nickel (Ni), or an alloy including at least one of the above materials may be a material of the leading wire configuring the solenoid.

The power supply unit 130 may supply power to the aerosol generating device 100. The power supply unit 130 may supply power to the coil 120. The power supply unit 130 may include a battery supplying a direct current to the aerosol generating device 100 and a conversion unit converting a current supplied from the battery into an alternating current supplied to the coil 120.

The battery may supply a direct current to the aerosol generating device 100. The battery may include a lithium iron phosphate ($LiFePO_4$) battery, but is not limited thereto. For example, the battery may include a lithium cobalt oxide ($LiCoO_2$) battery, a lithium titanate battery, or the like.

The conversion unit may include a low-pass filter performing filtering on a direct current supplied from the battery and outputting a current supplied to the coil 120. The conversion unit may further include an amplifier configured to amplify a direct current supplied from the battery. For example, the conversion unit may include a low-pass filter configuring a load network of a class-D amplifier.

The controller 140 may control power supplied to the coil 120. The controller 140 may control the power supply unit 130 such that power supplied to the coil 120 is adjusted. For example, the controller 140 may perform a control to maintain a constant temperature at which the heater assembly 110 heats a cigarette based on a temperature of the heater assembly 110.

The controller 140 may be implemented as an array of a plurality of logic gates or may be implemented as a combination of a general-purpose microprocessor and a memory in which a program executable in the microprocessor is stored. In addition, the controller 140 may be configured by a plurality of processing elements.

In the aerosol generating device 100, the temperature of the heater assembly 110 may be measured to maintain constant a temperature at which the heater assembly 110 heats a cigarette or to change the temperature of heating a cigarette according to a specific heating profile. However, the aerosol generating device 100 may not be separately provided with a unit configured to measure the temperature of the heater assembly 110. Instead, the temperature of the heater assembly 110 may be derived through a sensor pattern included as a single body in the heater assembly 110. Detailed descriptions of the sensor pattern included in the heater assembly 110 may be described below with reference to FIG. 4.

Figure 2:
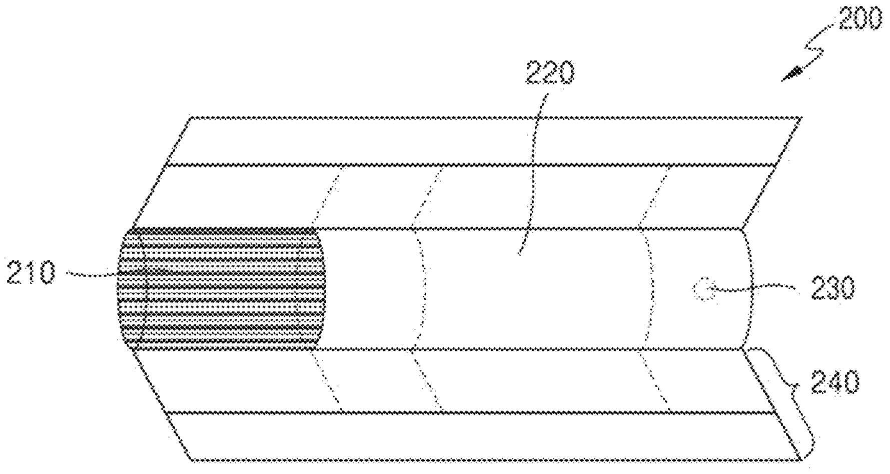
FIG. 2 is a diagram explaining a cigarette heated by a heater assembly according to some embodiments.

FIG. 2 is a diagram explaining a cigarette heated by a heater assembly according to some embodiments.

Referring to FIG. 2, a cigarette 200 may include a tobacco rod 210 and a filter rod 220. FIG. 2 illustrates that the filter rod 220 is configured in a single area, but is not limited thereto, and the filter rod 220 may be configured as a plurality of segments. For example, the filter rod 220 may include a first segment configured to cool aerosol and a second segment configured to filter a certain component included in the aerosol. In addition, the filter rod 220 may further include at least one segment configured to perform other functions.

The cigarette may be packaged via at least one wrapper 240. The wrapper 240 may have at least one hole through which external air may be introduced or internal air may be discharged. For example, the cigarette 200 may be packaged via one wrapper 240. As another example, the cigarette 200 may be doubly packaged via at least two wrappers 240. In detail, the tobacco rod 210 may be packaged via a first wrapper, and the filter rod 220 may be packaged via a second wrapper. The tobacco rod 210 and the filter rod 220, which are respectively packaged via wrappers, may be coupled to each other, and the cigarette 200 may be entirely packaged via a third wrapper.

The tobacco rod 210 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. The tobacco rod 210 may include other additives, such as flavors, a wetting agent, and/or organic acid. The tobacco rod 210 may include a flavored liquid, such as menthol or a moisturizer, which is injected to the tobacco rod 210.

The tobacco rod 210 may be manufactured in various methods. For example, the tobacco rod 210 may be formed as a sheet or a strand. In addition, the tobacco rod 210 may be formed as a pipe tobacco, which is formed of tiny bits cut from a tobacco sheet.

The tobacco rod 210 may be surrounded by a heat conductive material. For example, the heat conductive material may be, but is not limited to, a metal foil such as aluminum foil. The heat conductive material surrounding the tobacco rod 210 may uniformly distribute heat transmitted to the tobacco rod 210, and thus, the heat conductivity applied to the tobacco rod 210 may be increased and flavor of the aerosol generated from the tobacco rod 210 may be improved.

The filter rod 220 may include a cellulose acetate filter. The filter rod 220 may be manufactured in various shapes. For example, the filter rod 220 may include a cylinder-type rod or a tube-type rod having a hollow therein. In addition, the filter rod 220 may include a recess-type rod having a cavity therein. When the filter rod 220 includes a plurality of segments, the plurality of segments may be manufactured in different shapes from each other.

The filter rod 220 may be formed to generate flavors in the filter rod 220. For example, a flavoring liquid may be injected onto the filter rod 220, or an additional fiber coated with a flavoring liquid may be inserted into the filter rod 220.

The filter rod 220 may include at least one capsule 230. The capsule 230 may generate a flavor or aerosol. For example, the capsule 230 may have a configuration in which a liquid containing a flavoring material is wrapped with a film. The capsule 230 may have a spherical or cylindrical shape, but is not limited thereto.

When the filter rod 220 includes a segment configured to cool the aerosol, the cooling segment may include a polymer material or a biodegradable polymer material. For example, the cooling segment may include pure polyactic acid alone. Alternatively, the cooling segment may include a cellulose acetate filter having a plurality of holes. However, the cooling segment is not limited thereto, and the cooling segment may include a structure and a material cooling the aerosol.

In addition, the cigarette 200 described with reference to FIG. 2 is only an example, and articles accommodated in the aerosol generating device 100 and capable of generating aerosol may not be limited to the cigarette of FIG. 2. Accordingly, the article capable of generating aerosol may have various structures or components different from the cigarette 200.

Figure 3:
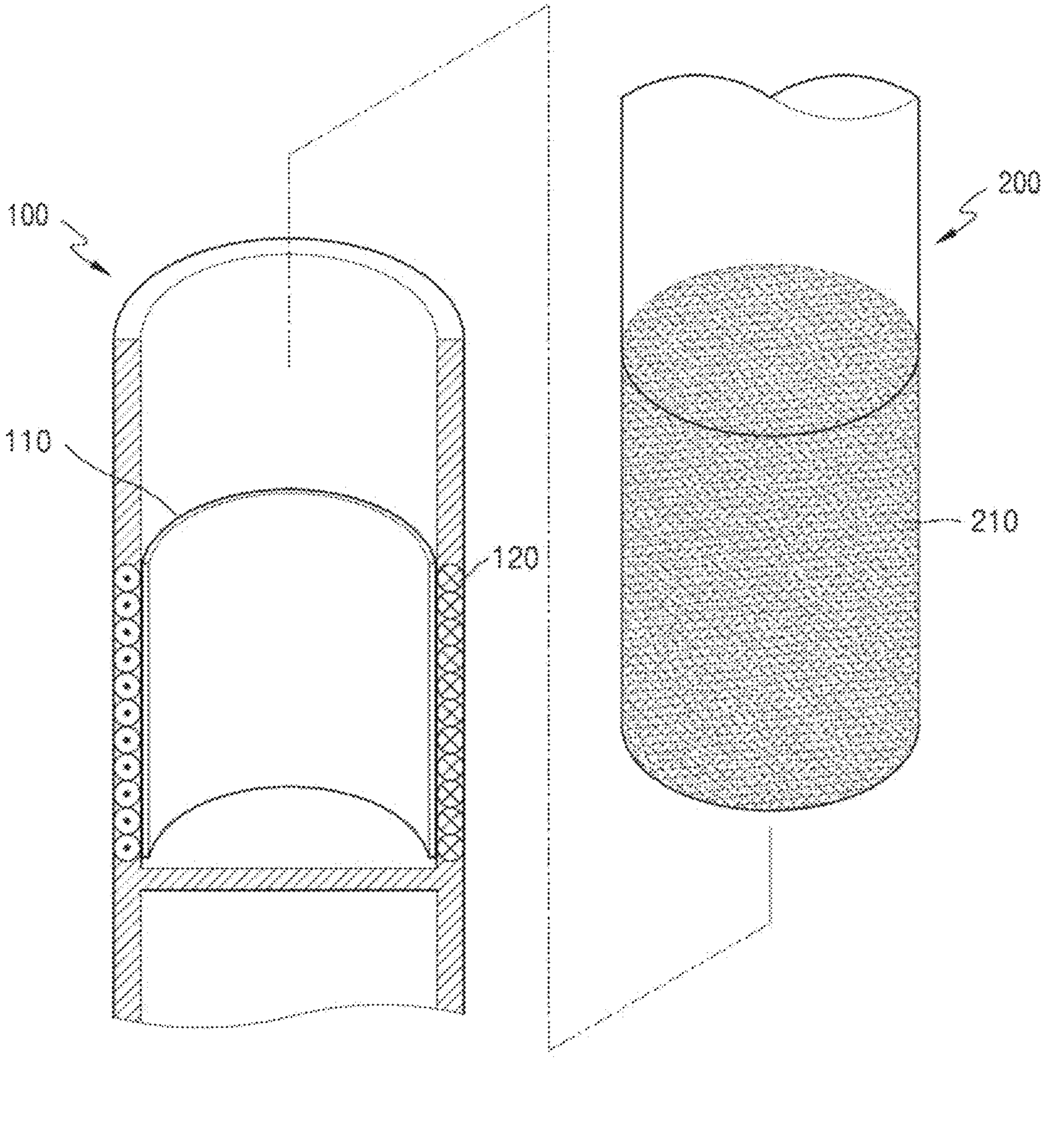
FIG. 3 is a diagram explaining an operation in which a cigarette is accommodated in an aerosol generating device and heated by a heater assembly, according to some embodiments.

FIG. 3 is a diagram explaining an operation in which a cigarette is accommodated in an aerosol generating device and heated by a heater assembly, according to some embodiments.

Referring to FIG. 3, an embodiment in which the cigarette 200 is accommodated in the aerosol generating device 100 including the heater assembly 110 is illustrated. However, the arrangements of the aerosol generating device 100, the heater assembly 110, the coil 120, and the cigarette 200 shown in FIG. 3 are only examples, and other arrangements in which the cigarette 200 accommodated in the aerosol generating device 100 is heated by the heater assembly 110 and the coil 120 may also be possible. In particular, the coil 120 is illustrated as being embedded in the external housing of the heater assembly 110, but the coil 120 may be located outside the heater assembly 110 to be arranged in a position suitable for applying a magnetic field to the heater assembly 110.

When the cigarette 200 is accommodated in the aerosol generating device 100, the tobacco rod 210 may be surrounded by the heater assembly 110. To this end, the heater assembly 110 may be arranged in the aerosol generating device 100 to surround at least a portion of the cigarette 200, the portion corresponding to the tobacco rod 210. Through such an arrangement, heat may be more directly transferred from the heater assembly 110 to the tobacco rod 210, and power efficiency of the aerosol generating device 100 may be increased.

The coil 120 may have a size and position corresponding to the heater assembly 110. As the coil 120 is arranged to correspond to the heater assembly 110, an alternating magnetic field formed by the coil 120 may be more directly applied to the heater assembly 110, and thus, the efficiency in which the heater assembly 110 is heated may be improved. As described above, because an arrangement of the heater assembly 110 and the tobacco rod 210 is also corresponds to each other, optimum power efficiency may be achieved by an arrangement of the heater assembly 110, the coil 120, and the tobacco rod 210.

Figure 4:
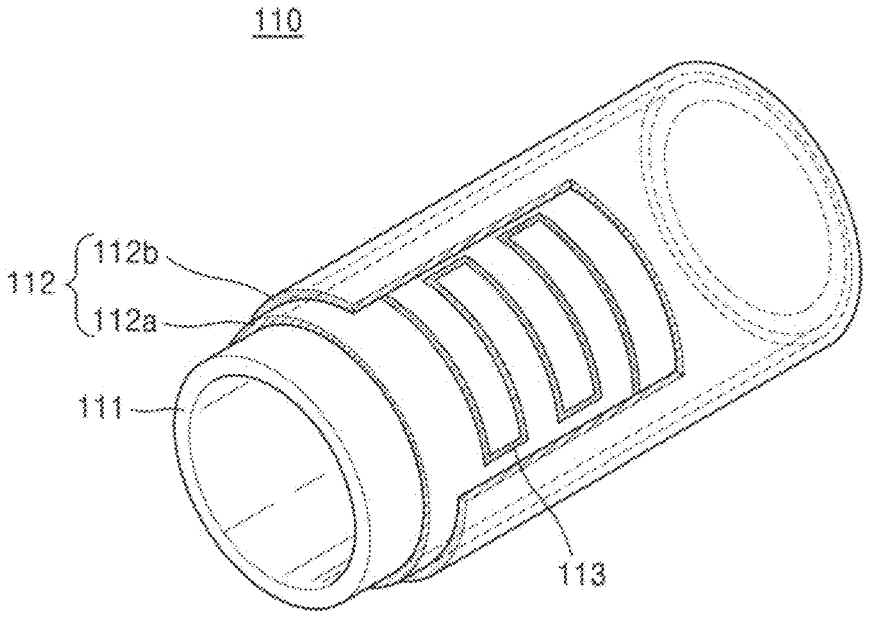
FIG. 4 is a diagram explaining a heater assembly configured to heat a cigarette, according to some embodiments.

FIG. 4 is a diagram explaining a heater assembly configured to heat a cigarette, according to some embodiments.

Referring to FIG. 4, the heater assembly 110 may include a heating layer 111, an insulating layer 112, and a sensor pattern 113. However, the present disclosure is not limited thereto. In addition to the components shown in FIG. 4, other general-purpose components may be further included in the heater assembly 110.

At least a portion of the heating layer 111 may include a susceptor material that generates heat by an external magnetic field. Accordingly, when an alternating magnetic field is applied from the coil 120 to the susceptor material of the heating layer 111, the susceptor material of the heating layer 111 may generate heat, and thus, the cigarette 200 may be heated to generate aerosol.

The susceptor material of the heating layer 111 may include any material that generates heat when an external magnetic field is applied from the outside. For example, at least a portion of the susceptor material may include a ferromagnetic body. When at least a portion of the susceptor material includes a ferromagnetic body, a large amount of heat may be released from the heating layer 111 by an external magnetic field.

The heating layer 111 may have a cylindrical shape therein in which an accommodation space accommodating the cigarette 200 is formed. When the cigarette 200 is accommodated in the aerosol generating device 100, the cigarette 200 may be accommodated in the accommodation space formed in the heating layer 111. The cross-sectional diameter of the accommodation space may be substantially the same as the cross-sectional diameter of the cigarette 200, or may be slightly greater than the cross-sectional diameter of the cigarette 200 to support the cigarette 200 accommodated in the accommodation space. The thickness of the heating layer 111 may be set to a proper value by considering the power required to heat the heating layer 111, the rate at which the cigarette 200 is heated by the heating layer 111, the cross-sectional diameter of the aerosol generating device 100, the cross-sectional diameter of the cigarette 200, or the like.

The insulating layer 112 may surround at least a portion of an outer side surface of the heating layer 111. The insulating layer 112 may prevent the sensor pattern 113 and other components of the aerosol generating device 100 from being electrically connected, such as an electrical contact between the heating layer 111 and the sensor pattern 113, and an electrical contact between the sensor pattern 113 and the coil 120. To this end, the insulating layer 112 may include a material corresponding to an electrical insulator or a non-conductor.

The insulating layer 112 may include a first insulating layer **112*a* and a second insulating layer 112*b*. The sensor pattern 113 may be embedded by the first insulating layer 112*a* and the second insulating layer 112*b*. For example, the first insulating layer 112*a* may support an inner side surface of the sensor pattern 113, and the second insulating layer 112*b* may surround an outer side surface of the sensor pattern 113. The sensor pattern 113 may be prevented from contacting other components of the aerosol generating device 100 through being embedded by the first insulating layer 112*a* and the second insulating layer 112*b***.

The first insulating layer **112*a* and the second insulating layer 112*b* may be formed by different operations from each other. For example, the first insulating layer 112*a* may be coated on the outer side surface of the heating layer 111 to surround at least a portion of the outer side surface of the heating layer 111, and the second insulating layer 112*b* may be, after printing the sensor pattern 113 on the first insulating layer 112*a*, coated on the first insulating layer 112*a* on which the sensor pattern 113 is printed. Detailed descriptions of a method of manufacturing the heater assembly 110 may be described below with reference to FIG. 6**.

The insulating layer 112 may include a material such as glass frit or an inorganic oxide. The glass frit may refer to a glass material such as glass powder. The inorganic oxide may include at least one of silicon (Si) oxide, boron (B) oxide, calcium (Ca) oxide, zirconium (Zr) oxide, and aluminum (Al) oxide. As the insulating layer 112 includes glass frit or an inorganic oxide, the insulating layer 112 may have a property of an electrical insulator or a non-conductor.

The sensor pattern 113 may be embedded in the insulating layer 112 and may be configured to measure the temperature of the heating layer 111. As the sensor pattern 113 is embedded in the insulating layer 112, the temperature of the heating layer 111 may be accurately measured by the sensor pattern 113. For example, when the sensor pattern 113 is electrically connected to other components of the aerosol generating device 100, an electrical resistance or a voltage at both ends of the sensor pattern 113, which is a characteristic value of the sensor pattern 113 configured to measure the temperature of the heating layer 111, may be changed. Accordingly, the characteristic value of the sensor pattern 113 may be prevented from being inaccurate by being embedded by the insulating layer 112.

The sensor pattern 113 may be configured to measure the temperature of the heating layer 111. For example, the sensor pattern 113 may be formed by printing a resistor having a temperature coefficient of resistance (TCR) configured to derive the temperature of the heating layer 111. However, the present disclosure is not limited thereto, and the sensor pattern 113 may be formed in a single body with the heating layer 111 and may be implemented as other units that may be used to measure the temperature of the heating layer 111.

When the sensor pattern 113 includes a resistor, the temperature of the heating layer 111 may be calculated based on a TCR of the sensor pattern 113. The sensor pattern 113 having a TCR is based on a proportional relationship between a temperature and a resistance value according to the TCR, and when the temperature of the sensor pattern 113 is changed, the resistance value of the sensor pattern 113 may be also proportionally changed. Accordingly, when the resistance value of the sensor pattern 113 is measured, the temperature of the sensor pattern 113 corresponding to the resistance value may be calculated. As a result, the temperature of the heating layer 111 and the temperature at which the cigarette 200 is heated by the heating layer 111 may be derived from the resistance value of the sensor pattern 113. The temperature of the sensor pattern 113 may be also determined from a voltage value or a current value deriving the resistance value of the sensor pattern 113, in addition to the resistance value of the sensor pattern 113.

The temperature of the resistor forming the sensor pattern 113 may be calculated in real time by the controller 140 from the resistance value and the TCR of the resistor. Alternatively, the controller 140 may derive the temperature of the resistor of the sensor pattern 113 by referring to a table prepared in advance with respect to a relationship between the resistance value of the resistor and the temperature of the resistor.

The characteristic at which the temperature of the heating layer 111 is derived by the sensor pattern 113 may vary depending on a material configuring the sensor pattern 113. The sensor pattern 113 may include various materials that may be used to measure the temperature of the heating layer 111. For example, the sensor pattern 113 may include at least one of ceramic, a semiconductor, metal, carbon, and a thermistor.

The accuracy at which the temperature of the heating layer 111 is derived by the sensor pattern 113 may vary depending on a numerical value of the TCR of the sensor pattern 113. Because the TCR may refer to a ratio of a change in resistance value to a temperature change, the larger the numerical value of the TCR, the greater the change in resistance value according to the temperature change. Accordingly, the temperature of the sensor pattern 113 or the heating layer 111 may be precisely derived. Therefore, the sensor pattern 113 may be required to include a material having a TCR of a high numerical value.

For example, the sensor pattern 113 may include metal, and the metal forming the sensor pattern 113 may include at least one of silver (Ag) and palladium (Pd). Silver has a high electrical conductivity and may also have a TCR of a high numerical value. Accordingly, when the sensor pattern 113 includes silver, the accuracy at with the temperature of the heating layer 111 is derived may be improved. Palladium is a metal used for alloying with various metals, and has lightness and high hardness, and thus may strengthen hardness through alloying with soft metals such as silver.

As an example numerical value, the metal forming the sensor pattern 113 may include silver in a weight ratio of 45 to 70 and palladium in a weight ratio of 10 to 35. Alternatively, the metal forming the sensor pattern 113 may include silver in a weight ratio of 50 to 55 and palladium in a weight ratio of 13 to 33. Alternatively. the metal forming the sensor pattern 113 may include silver in a weight ratio of 65 to 67 and palladium in a weight ratio of 10 to 15. It has been experimentally confirmed that the sensor pattern 113 formed according to the above-described numerical values has a relatively high TCR and may have a proper hardness to be formed as a single body with the heater assembly 110.

The sensor pattern 113 may include various patterns. The sensor pattern 113 may be formed on the outer side surface of the first insulating layer 112*a* to be positioned on at least a portion in a longitudinal direction and at least a portion in a circumferential direction of the outer side surface of the first insulating layer 112*a*. For example, the sensor pattern 113 may be formed, on the outer side surface of the first insulating layer 112*a*, in a spiral form in the circumferential direction and may be formed along only a portion in the longitudinal direction. Alternatively, the sensor pattern 113 may be formed, on the outer side surface of the first insulating layer 112*a*, over the entire longitudinal direction and may be formed only on a portion in the circumferential direction. However, the present disclosure is not limited to the above embodiments, and the sensor pattern 113 may be formed in another suitable shape that may reflect the temperature of the heating layer 111.

The heater assembly 110 may further include an electrode (not shown) connected to the sensor pattern 113 and configured to read a characteristic value of the sensor pattern 113. The electrode may be connected to a leading wire (not shown) configured to provide the characteristic value of the sensor pattern 113 to the controller 140. Because the electrode may be formed in the heater assembly 110, the characteristic value of the sensor pattern 113 may be provided to the controller 140 even when the sensor pattern 113 is embedded in the insulating layer 112.

As the sensor pattern 113 is formed as a single body with the heater assembly 110, the temperature of the heater assembly 110 may be measured without a separate temperature sensor in the heater assembly 110 or the aerosol generating device 100. Therefore, because a space configured to separately provide a temperature sensor may not be required, the design of the aerosol generating device 100 may be simplified, and the arrangement relationships between the components of the aerosol generating device 100 may be more flexible. In addition, as the sensor pattern 113 is coupled to the heating layer 111 as a single body, the temperature of the heating layer 111 may be accurately reflected, and accordingly, the control with respect to the temperature of the heating layer 111 may have high accuracy.

Figure 5:
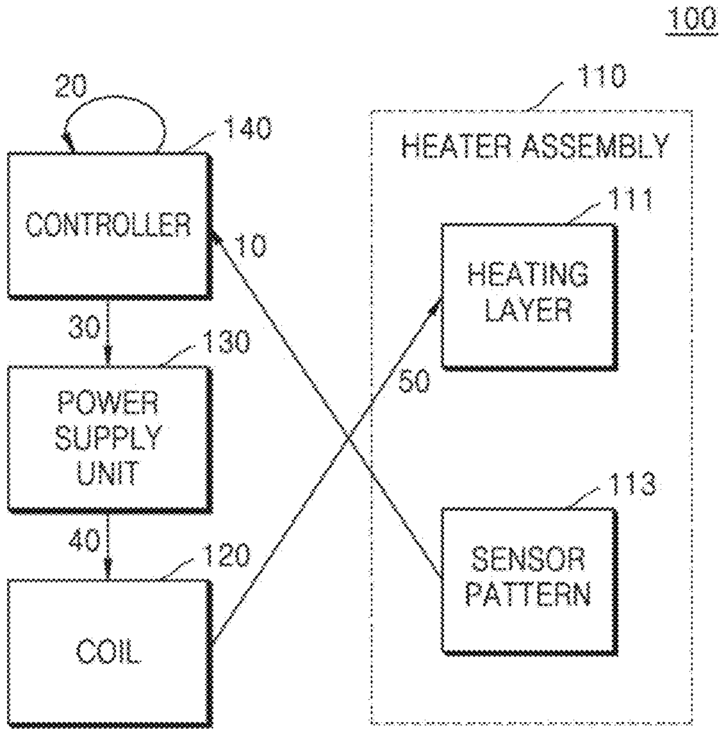
FIG. 5 is a diagram explaining an operation in which a temperature of a cigarette is controlled in an aerosol generating device, according to some embodiments.

FIG. 5 is a diagram explaining an operation in which a temperature of a cigarette is controlled in an aerosol generating device, according to some embodiments.

Referring to FIG. 5, an embodiment of an operation in which the aerosol generating device 100 controls the temperature of the heater assembly 110 is illustrated.

In operation 10, the controller 140 may read a characteristic value of the sensor pattern 113. For example, when the sensor pattern 113 includes a resistor having a TCR, the controller 140 may apply a current to the sensor pattern 113 to read a voltage formed in the sensor pattern 113 or apply a voltage to the sensor pattern 113 to read a voltage flowing in the sensor pattern 113. Alternatively, the controller 140 may include a resistance value measuring unit to directly read a resistance value of the sensor pattern 113.

In operation 20, the controller 140 may derive the temperature of the heating layer 111 based on the characteristic value of the sensor pattern 113, and adjust the power supplied to the coil 120 from the power supply unit 130 based on the temperature of the heating layer 111. The controller 140 may adjust power in a method of proportional-integral-differential (PID) control or on-off control. For example, when the temperature of the heating layer 111 is greater than an intended temperature, the controller 140 may reduce power supplied to the coil 120 or cut off power supplied to the controller 140.

In operation 30, the controller 140 may control the power supply unit 130 such that the power supplied to the controller 140 is adjusted. For example, when the temperature of the heating layer 111 is greater than an intended temperature, the controller 140 may control the power supply unit 130 to reduce the amplitude or frequency of an alternating current supplied to the coil 120.

In operation 40, the power supply unit 130 may adjust the power supplied to the controller 140 by the controller 140. For example, when the amplitude or frequency of the alternating current supplied to the coil 120 is reduced, the amplitude or frequency of the alternating current formed by the coil 120 may decrease.

In operation 50, an alternating magnetic field applied to the heating layer 111 from the coil 120 may be adjusted by the power supply unit 130. For example, when the amplitude or frequency of the alternating magnetic field formed by the coil 120 decreases, a degree of heat generated by a susceptor material forming at least a portion of the heating layer 111 may decrease, and accordingly, the temperature of the heating layer 111 and the cigarette may be reduced.

The above-described operations 10 to 50 have been described in a case where the temperature of the heating layer 111 is greater than the intended temperature, but operations 10 to 50 may be performed in a corresponding manner even when the temperature of the heating layer 111 is less than the intended temperature. The aerosol generating device 100 may heat the cigarette 200 according to a specific heating profile by periodically repeating operations 10 to 50.

Figure 6:
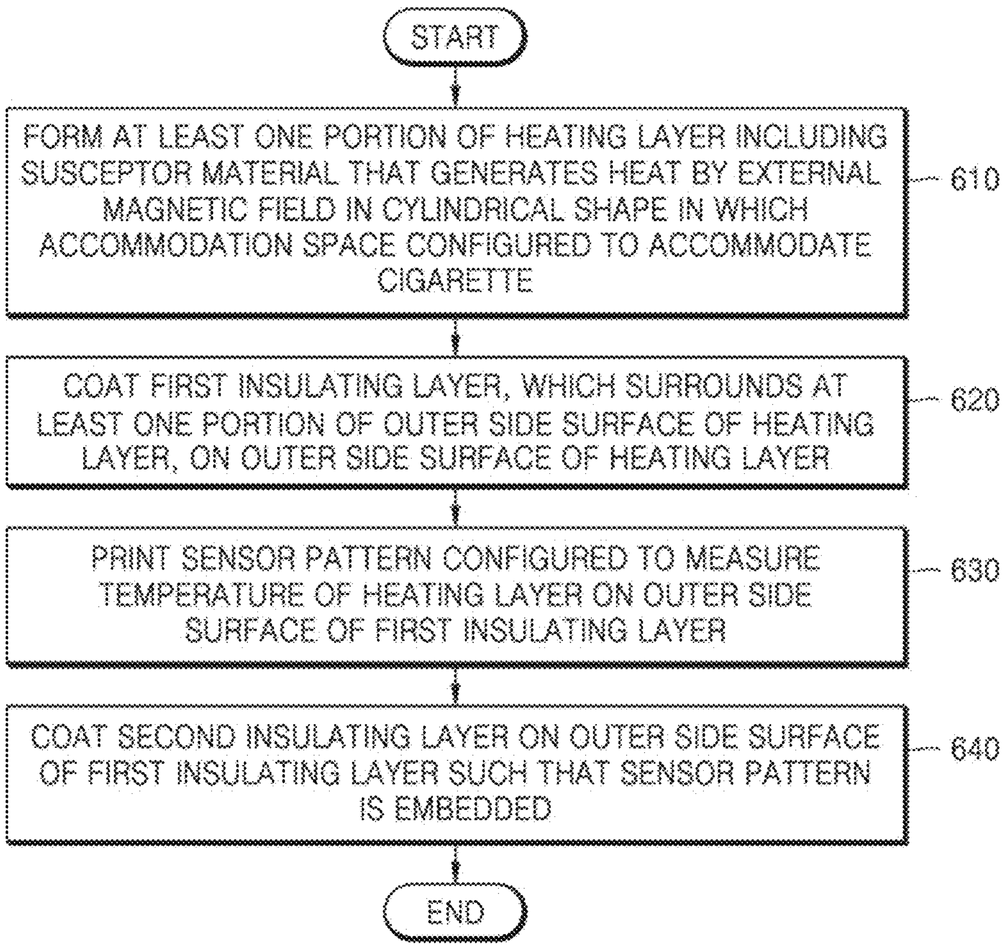
FIG. 6 is a flow chart illustrating operations of a method of manufacturing a heater assembly configured to heat a cigarette, according to some embodiments.

FIG. 6 is a flow chart illustrating operations of a method of manufacturing a heater assembly configured to heat a cigarette, according to some embodiments.

The method of FIG. 6 may be performed by a device configured to manufacture the heater assembly 110. One of ordinary skill in the art may understand that the device configured to manufacture the heater assembly 110 may be any device generally used to manufacture heaters in the art.

Referring to FIG. 6, the method of manufacturing the heater assembly 110 configured to heat the cigarette 200 may include operations 610 to 630. However, the present disclosure is not limited thereto, and other general-purpose operations other than operations shown in FIG. 6 may be further included in the method of manufacturing the heater assembly 110 configured to heat the cigarette 200.

In operation 610, the device configured to manufacture the heater assembly 110 may form at least a portion of the heating layer 111 including a susceptor material that generates heat by an external magnetic field in a cylindrical shape in which an accommodation space configured to accommodate the cigarette 200 therein is formed. An operation of forming the heater assembly 110 into a cylindrical shape may be performed in various methods. For example, as a general method of forming a metal, a method such as compression, injection, extrusion, lamination or rolling may be applied.

In operation 620, the device configured to manufacture the heater assembly 110 may coat the first insulating layer **112*a*, which surrounds at least a portion of the outer side surface of the heating layer 111, on the outer side surface of the heating layer 111. The operation of coating the first insulating layer 112*a* may refer to an operation of forming the first insulating layer 112*a*** as a film, such as deposition, injection, lamination, coating, or the like.

In operation 630, the device configured to manufacture the heater assembly 110 may print the sensor pattern 113 configured to measure the temperature of the heating layer 111 on an outer side surface of the first insulating layer **112*a*. The sensor pattern 113 may be formed on the outer side surface of the first insulating layer 112*a*** in a method of screen printing or silk-screen printing.

In operation 640, the device configured to manufacture the heater assembly 110 may coat the second insulating layer **112*b* on the outer side surface of the first insulating layer 112*a* such that the sensor pattern 113 is embedded. As described above, as the sensor pattern 113 is embedded by the first insulating layer 112*a* and the second insulating layer 112*b*, the accuracy in which the temperature of the heating layer 111 or the heating layer 111 is measured by the sensor pattern 113 may be increased, and the sensor pattern 113 may be formed as a single body with the heating layer 111 such that the temperature of the heating layer 111** may be accurately measured without a temperature sensor.

The device configured to manufacture the heater assembly 110 may further form, in the heater assembly 110, an electrode connected to the sensor pattern 113 and configured to read characteristic values of the sensor pattern 113. The device configured to manufacture the heater assembly 110 may perform the operation of forming the electrode between operations 620 and 630, between operations 630 and 640, or after operation 640.

Although the embodiments have been described in detail above, the scope of the present disclosure is not limited thereto, and those of ordinary skill in the art may understand that various modifications and improvements using the basic concept of the present disclosure as defined in the following claims are included in the scope of the present disclosure.

The invention claimed is:

1. A heater assembly configured to heat a cigarette, the heater assembly comprising:

a heating layer having at least a portion comprising a susceptor material generating heat by an external magnetic field and having a cylindrical shape therein in which an accommodation space configured to accommodate the cigarette is formed;

an insulating layer surrounding at least a portion of an outer side surface of the heating layer; and a sensor pattern embedded inside the insulating layer such that the sensor pattern is not exposed to the heating layer, and configured to measure a temperature of the heating layer.

2. The heater assembly of claim 1, wherein the sensor pattern is formed by printing a resistor having a temperature coefficient of resistance (TCR) configured to derive the temperature of the heating layer.

3. The heater assembly of claim 1, wherein the sensor pattern comprises at least one material of ceramic, a semiconductor, metal, carbon, and a thermistor.

4. The heater assembly of claim 3, wherein the metal comprises at least one of silver (Ag) and palladium (Pd), the sensor pattern comprises silver in a weight ratio of 45 to 70 and palladium in a weight ratio of 10 to 35.

5. The heater assembly of claim 1, wherein the insulating layer comprises a first insulating layer supporting an inner side surface of the sensor pattern; and a second insulating layer surrounding the outer side surface of the sensor pattern.

6. The heater assembly of claim 1, wherein the insulating layer comprises at least one material of silicon (Si) oxide, boron (B) oxide, calcium (Ca) oxide, zirconium (Zr) oxide, and aluminum (Al) oxide.

7. The heater assembly of claim 1, wherein the susceptor material comprises at least a portion comprising a ferromagnetic body.

8. The heater assembly of claim 1, further comprising an electrode connected to the sensor pattern and configured to read a characteristic value of the sensor pattern.

9. A method of manufacturing a heater assembly configured to heat a cigarette, the method comprising:

forming a heating layer having at least a portion comprising a susceptor material generating heat by an external magnetic field and having a cylindrical shape therein in which an accommodation space configured to accommodate the cigarette is formed;

coating, on an outer side surface of the heating layer, a first insulating layer surrounding at least a portion of the outer side surface of the heating layer;

printing, on an outer side surface of the first insulating layer, a sensor pattern configured to measure a temperature of the heating layer such that the sensor pattern is not exposed to the heating layer; and coating a second insulating layer on the outer side surface of the first insulating layer to embed the sensor pattern.

10. An aerosol generating device comprising the heater assembly of claim 1, the aerosol generating device further comprising:

a coil configured to apply an alternating magnetic field to the heater assembly;

a power supply unit configured to supply power to the coil; and a controller configured to control power supplied to the coil.

11. The aerosol generating device of claim 10, wherein the coil is wound along an outer side surface of the heater assembly, extends in a longitudinal direction of the aerosol generating device, and is arranged in a position corresponding to the heater assembly.

12. The aerosol generating device of claim 10, wherein the power supply unit comprises a battery configured to supply a direct current to the aerosol generating device; and a conversion unit configured to convert the direct current supplied from the battery into an alternating current to be applied to the coil.

13. The aerosol generating device of claim 10, wherein the controller is configured to receive, from the sensor pattern, a characteristic value of the sensor pattern associated with the temperature of the heating layer, and adjust the power supplied to the coil from the power supply unit based on the temperature of the heating layer.

* * * * *